(12) United States Patent
Pena-Ruiz

(10) Patent No.: US 10,232,210 B2
(45) Date of Patent: Mar. 19, 2019

(54) PORTABLE AND CONFIGURABLE EXERCISE APPARATUS

(71) Applicant: Miguel Angel Pena-Ruiz, Chula Vista, CA (US)

(72) Inventor: Miguel Angel Pena-Ruiz, Chula Vista, CA (US)

( * ) Notice: Subject to any disclaimer, the term of this patent is extended or adjusted under 35 U.S.C. 154(b) by 159 days.

(21) Appl. No.: 15/261,396

(22) Filed: Sep. 9, 2016

(65) Prior Publication Data

US 2017/0072241 A1 Mar. 16, 2017

Related U.S. Application Data

(60) Provisional application No. 62/217,668, filed on Sep. 11, 2015.

(51) Int. Cl.
*A63B 21/00* (2006.01)
*A63B 23/12* (2006.01)
(Continued)

(52) U.S. Cl.
CPC .... *A63B 21/00069* (2013.01); *A63B 21/0085* (2013.01); *A63B 21/0087* (2013.01);
(Continued)

(58) Field of Classification Search
CPC .......... A63B 21/00069; A63B 21/0087; A63B 21/4045; A63B 23/03516; A63B 23/1209; A63B 21/0085; A63B 21/4035; A63B 2225/50; A63B 2210/50; A63B 2220/51; A63B 21/4049; A63B 2208/0228; A63B 23/1281; A63B 2208/0223; A63B 2220/13; A63B 23/03508; A63B 23/1245; A63B 23/03533; A63B 2071/0018; A63B 21/0083; A63B 2208/0204; A63B 2023/0411; A63B 23/0233; A63B 2220/833; A63B 21/4034; A63B 23/0205; F16B 7/10

See application file for complete search history.

(56) References Cited

U.S. PATENT DOCUMENTS 3,784,195 A * 1/1974 Johnson ................. A63B 21/04
482/123
7,090,626 B1 * 8/2006 Miller ................. A63B 21/4035
482/139

(Continued)

*Primary Examiner* — Joshua Lee
*Assistant Examiner* — Shila Jalalzadeh Abyaneh
(74) *Attorney, Agent, or Firm* — Justin Lampel

(57) ABSTRACT

The present device generally relates to a portable and configurable exercise apparatus. The apparatus has a main aim unit and a removable foot unit. The main arm unit has a first hand grip and a second hand grip separated by a main telescoping shaft wherein pulling the first grip away from the second grip requires resistance and, therein develops strength. The device is configurable so as to allow the user to select the desired resistance. The removable foot unit may be temporarily inserted over the first or the second hand grip so that a user may place his/her feet (either standing, sitting or squatting) over the first or second hand grip and may pull upward with the remaining hand grip to exercise alternative muscles. The first and the second hand grip may rotate with respect to the main body shaft to allow alternative exercises.

2 Claims, 7 Drawing Sheets

(51) Int. Cl.
    *A63B 23/035*     (2006.01)
    *A63B 21/008*     (2006.01)
    *F16B 7/10*     (2006.01)
    *A63B 23/02*     (2006.01)
    *A63B 23/04*     (2006.01)
    *A63B 71/00*     (2006.01)

(52) U.S. Cl.
    CPC ...... *A63B 21/4035* (2015.10); *A63B 21/4045* (2015.10); *A63B 23/03516* (2013.01); *A63B 23/1209* (2013.01); *F16B 7/10* (2013.01); A63B 21/0083 (2013.01); A63B 21/4034 (2015.10); A63B 21/4049 (2015.10); A63B 23/0205 (2013.01); A63B 23/0233 (2013.01); A63B 23/03508 (2013.01); A63B 23/03533 (2013.01); A63B 23/1245 (2013.01); A63B 23/1281 (2013.01); A63B 2023/0411 (2013.01); A63B 2071/0018 (2013.01); A63B 2208/0204 (2013.01); A63B 2208/0223 (2013.01); A63B 2208/0228 (2013.01); A63B 2210/50 (2013.01); A63B 2220/13 (2013.01); A63B 2220/51 (2013.01); A63B 2220/833 (2013.01); A63B 2225/50 (2013.01)

(56) References Cited

U.S. PATENT DOCUMENTS

2008/0234116 A1*   9/2008   Elzerman ............. A63B 21/015
                                                        482/123
2009/0280968 A1*  11/2009   Weir ...................... A63B 21/05
                                                        482/123

\* cited by examiner

PORTABLE AND CONFIGURABLE EXERCISE APPARATUS

CROSS REFERENCE TO RELATED APPLICATION

The following application is based on and claims the priority benefit of U.S. Provisional Application Ser. No. 62/217,668 filed on Sep. 11, 2015, currently co-pending; the entire contents of which are incorporated by reference.

BACKGROUND OF THE DEVICE

The present device generally relates to a portable and configurable exercise apparatus. The apparatus has a main arm unit (the 'first unit') and a removable foot unit (the 'second unit'). The main arm unit has a first hand grip and a second hand grip separated by a main telescoping shaft wherein pulling the first grip away from the second grip requires resistance and, therein develops strength. The device is configurable so as to allow the user to select the desired resistance. The removable foot unit may be temporarily inserted over the first or the second hand grip so that a user may place his/her feet (either standing, sitting or squatting) over the first or second hand grip and may pull upward with the remaining hand grip to exercise alternative muscles. The first and the second hand grip may rotate with respect to the main body shaft to allow alternative exercises.

The present exercise device relates to portable exercise apparatus particularly suited to exercising the chest and back muscles of a person. The device may exercise these muscles while the handles of the device are extended. The device further may exercise the biceps, triceps, abdominal, lower back and leg muscles of the person. Existing versatile exercise equipment is generally large and heavy. It is generally necessary to exercise agonist and antagonist muscles separately. Disabled and injured persons often do not have safe, lightweight and portable exercise equipment readily available to them. Often weights are too heavy for elderly or disabled persons. They may need monitoring by another person to utilize weights to avoid dangerous situations. Many home gym systems are very expensive. Also many of the rehabilitation exercise equipment is not portable. It is desirable to have a portable lightweight machine that is easy to transport and store. It is desirable to provide a system that can be used by elderly people, wheelchair-bound people, and people with no disability. One preferred form of exercise device utilizes a pneumatic or hydraulic cylinder, as opposed to bands. Bands do not provide a constant resistance and can snap, injuring the user.

Multi-grip exercise devices have been around for years. For example, U.S. Pat. No. 9,364,704 to Kuka discloses a multi-grip exercise weight apparatus having a weight plate pivotally attached to a bar handle such that the weight plate is pivotable in both angular directions. A grip ring is disposed around the perimeter of the weight plate. A plurality of support spokes extend from a central hub on the weight plate radially outwardly to the grip ring. A plurality of different grip regions are defined on the grip ring between adjacent support spokes. An end handle, or kettlebell handle, may be attached to the weight plate to provide a looped kettlebell-type grip.

Further, U.S. Pat. No. 8,591,387 to Fife discloses various embodiments of a multi-grip dumbbell. In one embodiment of the present invention, a multi-grip dumbbell includes a central handle, a first weighted head interconnected to the central handle in proximity to a first end of the central handle, and a second weighted head interconnected to the central handle in proximity to a second end of the central handle. The first weighted head is approximately evenly weighted with the second weighted head. The first weighted head includes a first weighted end handle and two weighted side handles. Similarly, the second weighted head includes a second weighted end handle and two weighted side handles.

However, these prior exercise devices fail to disclose an exercise device which is easy to use and efficient as the present portable and configurable exercise device, A need, therefore, exists for an improved portable and configurable exercise device.

SUMMARY OF THE INVENTION

The present device generally relates to a portable and configurable exercise apparatus. The apparatus has a main arm unit (the 'first unit') and a removable foot unit (the 'second unit'). The main arm unit has a first hand grip and a second hand grip separated by a main telescoping shaft wherein pulling the first grip away from the second grip requires resistance and, therein develops strength. The device is configurable so as to allow the user to select the desired resistance. The removable foot unit may be temporarily inserted over the first or the second hand grip so that a user may place his/her feet (either standing, sitting or squatting) over the first or second hand grip and may pull upward with the remaining hand grip to exercise alternative muscles. The first and the second hand grip may rotate with respect to the main body shaft to allow alternative exercises.

An advantage of the present device is to provide a portable and configurable exercise apparatus which is easy to use and efficient.

Still another advantage of the present portable and configurable exercise apparatus is to provide an exercise apparatus which allows a user to exercise various muscles of the body depending on the desired configuration.

And another advantage of the present portable and configurable exercise apparatus is that the present exercise apparatus allows a user to exercise his/her arms, abdominal, legs and back core muscles while utilizing both hands on the same hand grip wherein the remaining hand grip is secured under the feet of the user.

Still another advantage of the present exercise device is that the present device may exercise the back and chest muscles of the user when the user pulls and pushes the apparatus with one hand on each of the hand grips.

Still another advantage of the present portable and configurable exercise apparatus is that a user need not utilize heavy and dangerous free weights.

Another advantage of the present device is that the present device is a single apparatus which may be adjusted easily to provide at least four different resistance settings of 5, 10, 15 and 2.0 Lbs per handle.

Yet another advantage of the present device is that the present device may utilize internal sensors to track the exercise performed by a user over time wherein the sensors may further transfer the collected data to a computer for analysis and review.

For a more complete understanding of the above listed features and advantages of the portable and configurable exercise apparatus reference should be made to the following detailed description of the preferred embodiments and to the accompanying drawings.

DETAILED DESCRIPTION OF THE PREFERRED EMBODIMENTS

The present device generally relates to a portable and configurable exercise apparatus. The apparatus has a main arm unit (the 'first unit') and a removable foot unit (the 'second unit'). The main arm unit has a first hand grip and a second hand grip separated by a main telescoping shaft wherein pulling the first grip away from the second grip requires resistance and, therein develops strength. The device is configurable so as to allow the user to select the desired resistance. The removable foot unit may be temporarily inserted over the first or the second hand grip so that a user may place his/her feet (either standing, sitting or squatting) over the first or second hand grip and may pull upward with the remaining hand grip to exercise alternative muscles. The first and the second hand grip may rotate with respect to the main body shaft to allow alternative exercises.

Figure 1:
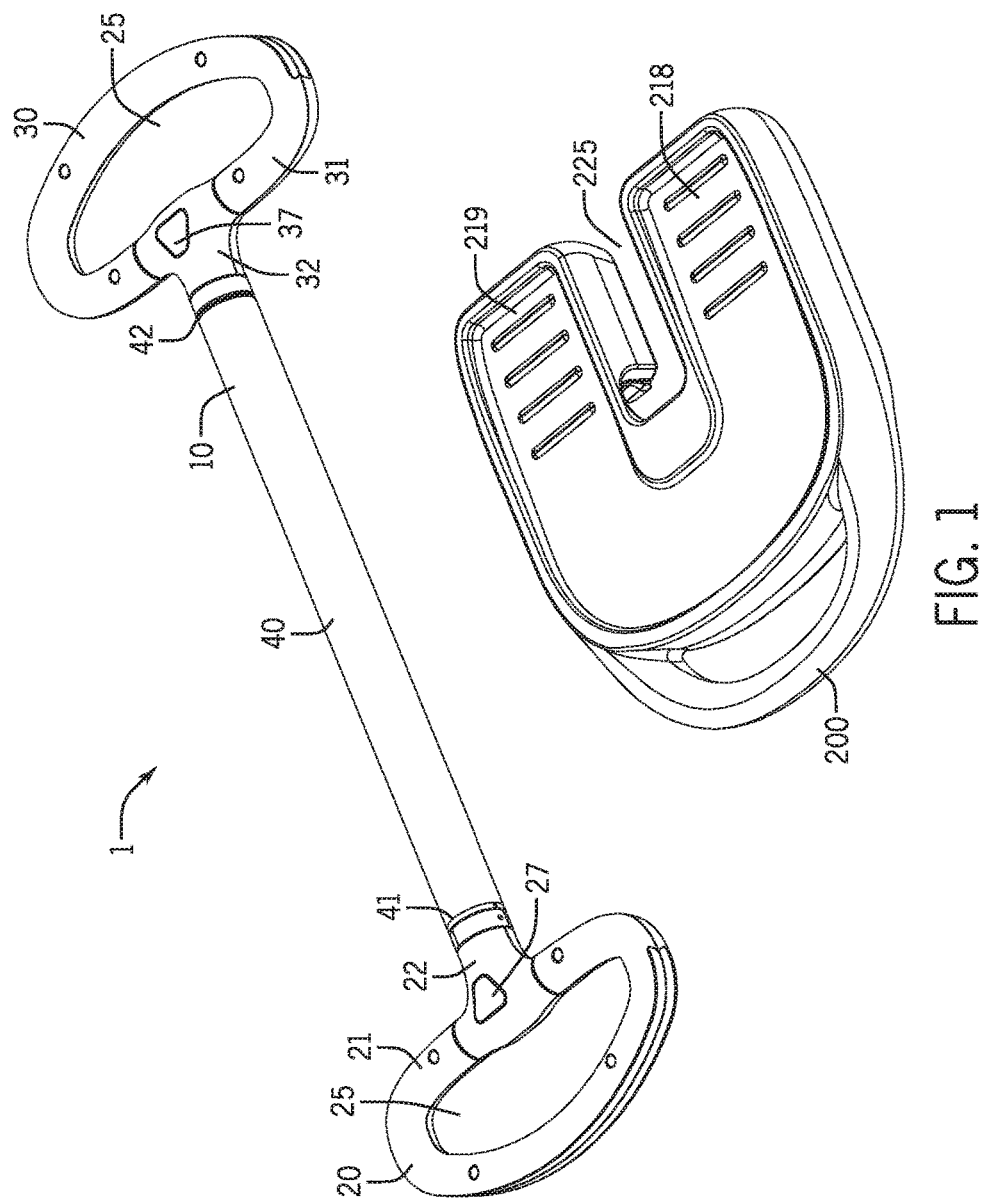
FIG. 1 illustrates a perspective view of the first unit and the second unit of the portable and configurable exercise apparatus wherein the first unit is separated from the second unit.

Referring first to FIG. 1, in an embodiment, a portable and configurable exercise apparatus 1 is provided. The exercise apparatus 1 may have a first unit 10 and a second unit 200.

In an embodiment, the first unit 10 may be removable from the second unit 200 (as is illustrated in FIG. 1). In an embodiment, the first unit 10 may have a first hand grip 20 and a second hand grip 30. The first hand grip 20 and the second hand grip 30 may be generally mirror images of each and may be separated by a telescoping main shaft 40 (or "elongated telescoping shaft"). In particular, the main telescoping shaft 40 may have a first end 41 and a second end 42 wherein the first hand grip 20 is located at the first end 41 of the main telescoping shaft 40 and wherein the second hand grip 30 is located at the second end 42 of the main telescoping shaft 40.

Figure 2:
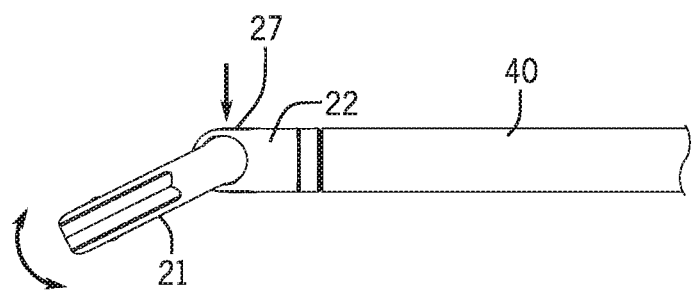
FIG. 2 illustrates a side view of the rotatable portion of the hand grip rotating with respect to the stationary joint of the hand grip.

In an embodiment, the first hand grip 20 and the second hand grip 30 may each have an opening 25. The opening 25 is generally designed to receive the hand (or hands) of a user, but may also be used to receive other portions of the user's body for various exercises. In an embodiment, the first hand grip 20 and the second hand grip 30 are lightly padded for comfort. The first hand grip 20 may have a rotatable portion 21 and a stationary joint 22. The second hand grip 30 may have a rotatable portion 31 and a stationary joint 32. Located on the stationary joint 22 of the first hand grip 20 may be an activation button 27. Located on the stationary joint 32 of the second hand grip 30 may be an activation button 37. The activation button 27, 37 of the hand grips 20, 30 may be used to allow rotatable portion 21, 31 of the first hand grip 20 and the second hand grip 30 to rotate upward or downward with respect to the stationary joint 22, 32 as is illustrated in FIG. 2.

Figure 6:
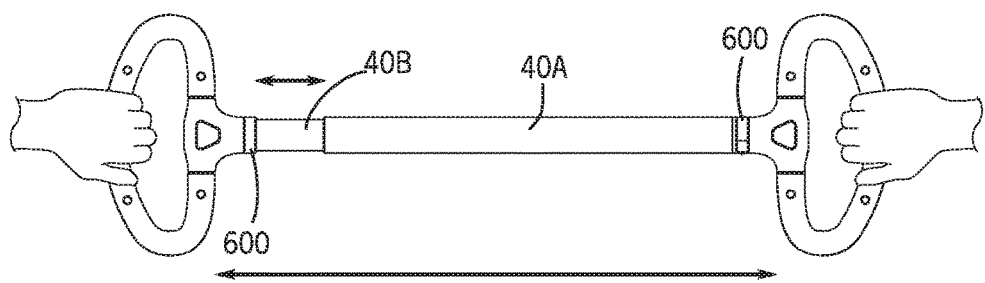
FIG. 6 illustrates a side view of the first unit wherein the main telescoping shaft is in the process of being extended or contracted during an exercise.

FIG. 1 illustrates the first unit 10 and the second unit 200 separated from each other. in an embodiment, a user may electively utilize only the first unit 10 without utilizing the second unit 200. In particular, a user may simply grasp the first hand grip 20 and the second hand grip 30 and may pull the first hand grip 20 away from the second hand grip 30 by, for example, placing the device 1 in front of his/her chest wherein the telescoping main shaft 40 is located in front of his/her chest and may pull the hand grips 20, 30 away from each (as illustrated in FIG. 6). The apparatus 1 may be selectively adjusted to control the resistance, as discussed below.

Figure 3:
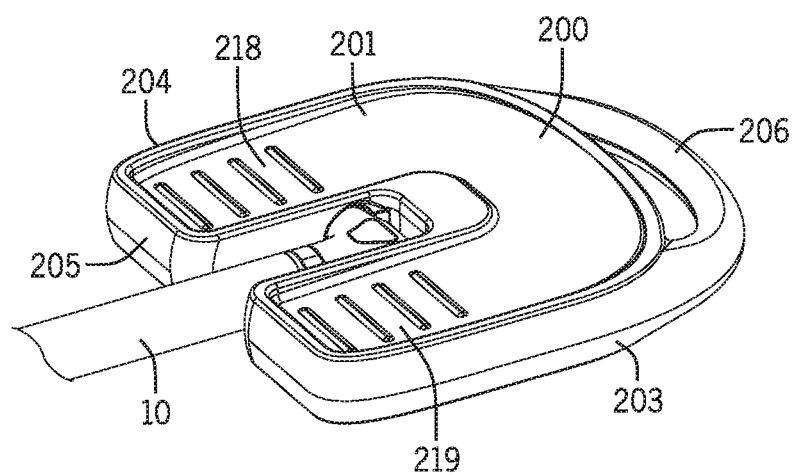
FIG. 3 illustrates the first unit secured to the second unit in a generally parallel orientation.
Figure 4:
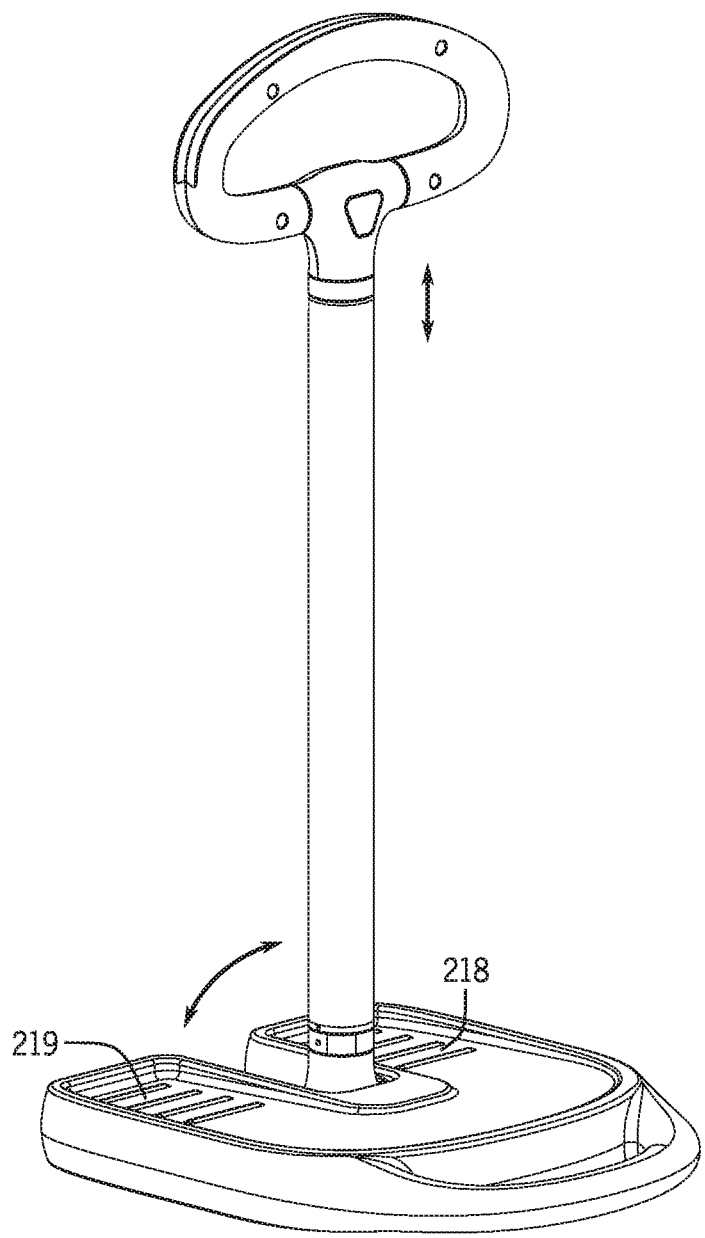
FIG. 4 illustrates the first unit secured to the second unit wherein the first unit is rotated into a perpendicular orientation with respect to the second unit and wherein the portable and configurable exercise apparatus is capable of being used in a seated, standing or squatted position.
Figures 5A, 5B:
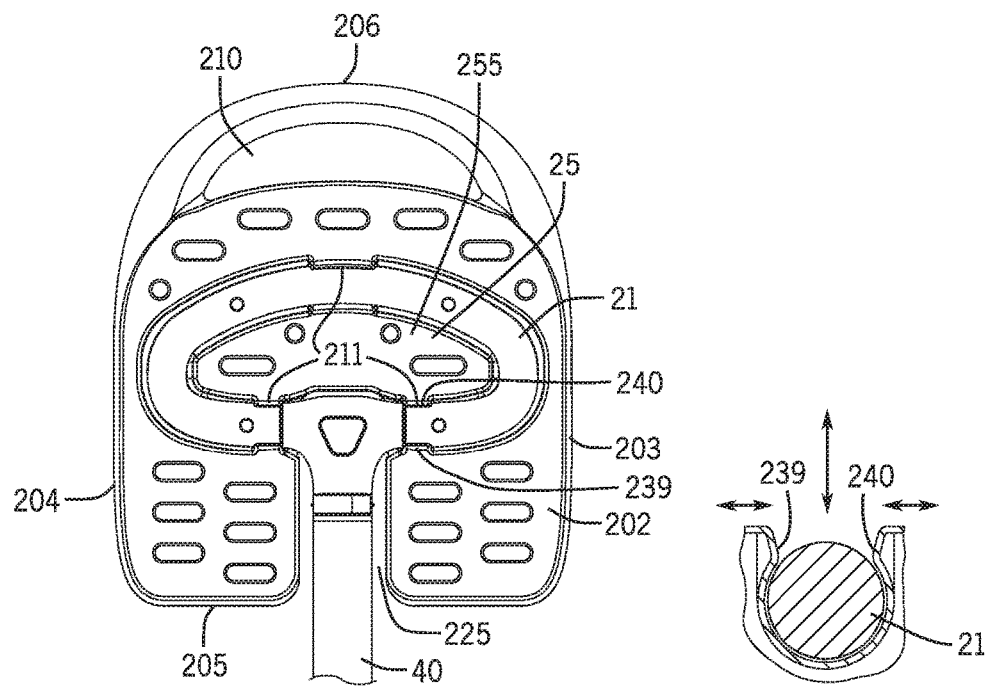
FIG. 5A illustrates a view of the bottom of the second unit wherein a hand grip of the first unit is temporarily secured under the bottom of the second unit.
FIG. 5B illustrates the securing snaps of the second unit securing a portion of a hand grip of the first unit.

Referring now to FIGS. 3-5, in an embodiment the first unit 10 may be temporarily secured to the second unit 200 to perform an exercise. In an embodiment, the second unit 200 may have a top 201, a bottom 202 (FIG. 5), a first side 203, a second side 204, a front 205 and a back 206. An opening 210 (FIG. 5) may be located near the back 206 of the second unit 200 so as to allow a user to grasp the second unit 200 and carry the same. Located on the bottom 202 of the second unit 200 may be a generally hollow receiving area 255 wherein the generally hollow receiving area 255 temporarily receives and temporarily secures the first hand grip 20 or the second hand grip 30 of the device 1. The top 201 of the second unit 200 may have a first foot brace 218 and a second foot brace 219. In an embodiment, the first foot brace 218 receives a foot of the user and the second foot brace 219 receives the other foot of the user. The first foot brace 218 and the second foot brace 219 may be surrounded by a slightly elevated ridge and may further have anti-slip grips (FIG. 1) to prevent unintended movement of the user's feet while exercising.

In particular, a user may temporarily snap the rotating portion 21, 31 of the first or the second handgrip 20, 30 into securing snaps 211 located on the bottom 202 (FIG. 5) of the second unit 200. The securing snaps 211 may temporarily secure the hand grip 20, 30 of the first unit 10 by, for example, friction. More specifically, the securing snaps 211 may have a first prong 239 and a second prong 240 which may be temporarily bend away from each other so as to temporarily receive a portion of the hand grip 20, 30. When the hand grip 20, 30 is properly in place, the first prong 239 and the second prong 240 may return to their relaxed state and may therein temporarily secure a portion of the hand grip 20, 30. To remove the hand grip 20, 30 (and therein the first unit 10) from the second unit 200, the reverse process is implemented.

Figure 7:
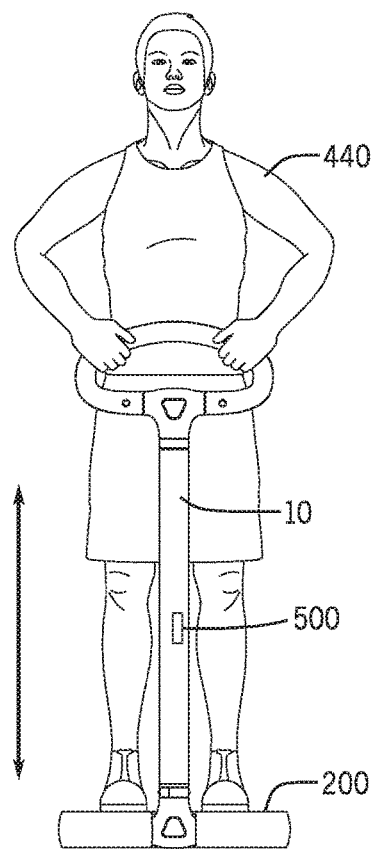
FIG. 7 illustrates a front view of the device wherein a user is standing on the second unit and is pulling up on the hand grip of the first unit.
Figure 9:
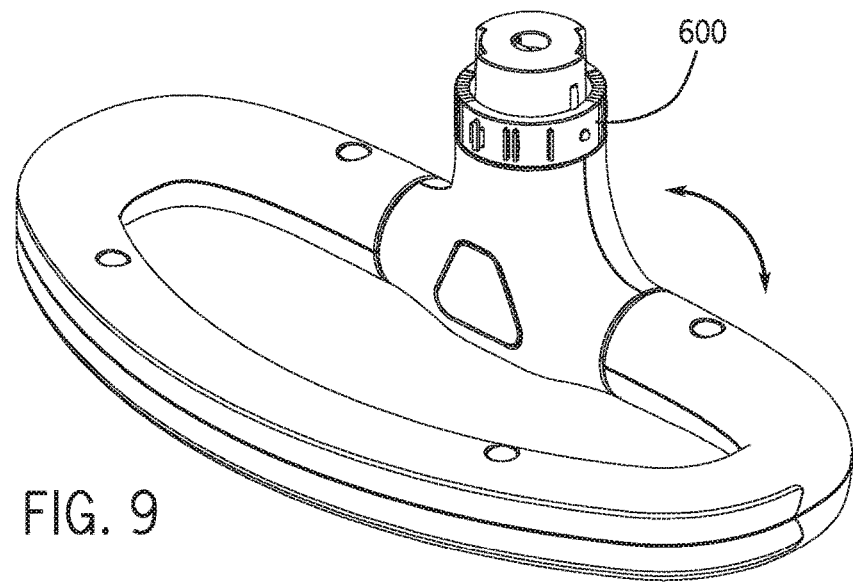
FIG. 9 illustrates a view of one of the hand grips rotated into a generally perpendicular orientation with respect to the main telescoping shaft; in this position the first unit may be secured under the second unit for utilizing the device in a seated, standing or squatted position.
Figure 10:
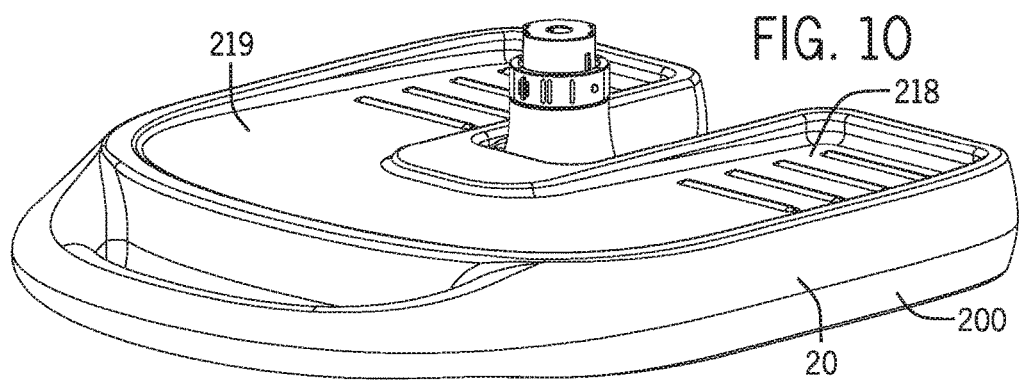
FIG. 10 illustrates a perspective view of the hand grip visible below the bottom of the second unit.
Figure 11:
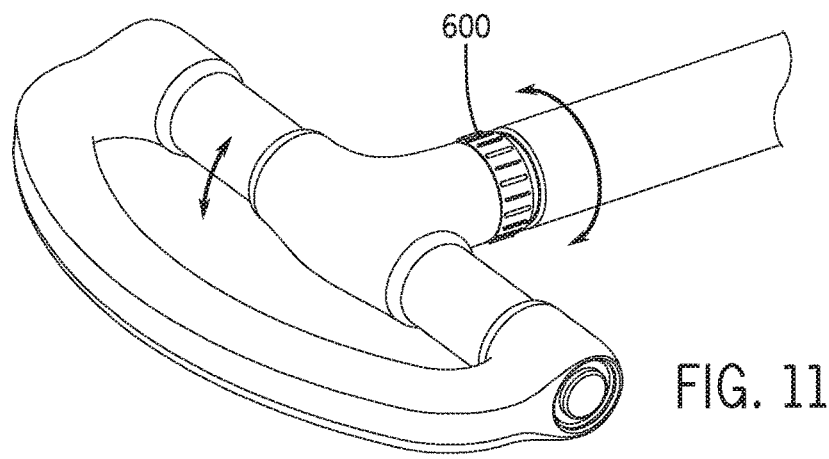
FIG. 11 illustrates a close up of the hand grip of the first unit.

Once the handgrip 20, 30 is secured to the bottom 202 of the second unit 200, the telescoping main shaft 40 may be rotated with respect to the hand grip 20, 30 which is secured to the bottom 202 of the second unit 200. In particular, the button 27, 37 of the hand grip 20, 30 may be pressed so as to unlock the hand grip 20, 30 and therein allow the hand grip 20, 30 to rotate approximately two hundred and seventy degrees with respect to the telescoping main shaft 40 (See FIG. 2). An elongated generally rectangular opening 225 (FIGS. 1 and 5) located between the first foot brace 218 and the second foot brace 219 of the second unit 200 may allow the telescoping main shaft 40 of the first unit 10 to rotate (generally upward) with respect to the second unit 200. In particular, the telescoping main shaft 40 may rotate upward even while the second unit 200 is in a stationary position parallel to the ground and even when a user is standing on the second unit 200. Preferably, the telescoping main shaft 40 rotates upward approximately ninety degrees to a generally perpendicular orientation with respect to the second unit 200 (FIGS. 7 and 9). FIG. 10 illustrates an embodiment wherein the second unit 200 is secured over the hand grip 20 of the first unit 10.

Referring now to FIG. 7, as stated above, in an embodiment, the main telescoping shaft 40 may be rotated approximately ninety degrees upward with respect to the second unit 200. In this orientation, a user 440 may stand on the top 201 of the second unit 200 and may pull upward for exercise. The resistance in pulling upward is generated by the same interior mechanism as the pulling by both hands (as illustrated in FIG. 6). Again, a user may alter the resistance by turning the outer cylinder, the outer cylinder is attached to the piston, and the piston helps to turn a selector gasket located at the end of the piston, it has 4 settings, 5, 10, 15, 20 Lb. When the outer cylinder is turned, it changes the resistance of air flow inside of the cylinder, the resistance depends on the size of 4 holes where the air needs to flow thru, and these holes allow flow from one side of the cylinder to the other side. The smaller the hole, the higher the resistance to air flow and thus, the resistance the user experiences when he pulls or pushes the inner and outer cylinder while grasping the handles.

Figure 8:
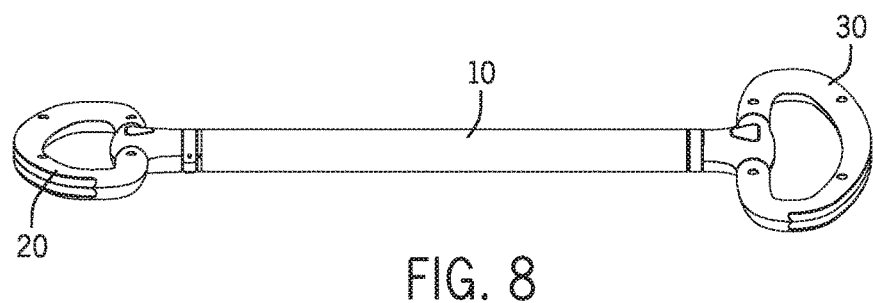
FIG. 8 illustrates a view wherein one of the hand grips is rotated with respect to the second hand grip for alternative exercises.

Referring now to FIG. 8, in an embodiment, not only may the first hand grip 20 and the second hand grip 30 rotate upward or downward (along an x axis) with respect to the main telescoping shaft 40 (such movement is illustrated in FIG. 2), but, in an embodiment, the first hand grip 20 and the second hand grip 30 may also rotate along a y-axis so that one hand grip 20 may be parallel to the ground while the other hand grip may be perpendicular to the ground, but still along the same z axis as illustrated in FIG. 8. Allowing this configuration allows for additional exercises to be performed.

Figures 12A, 12B:
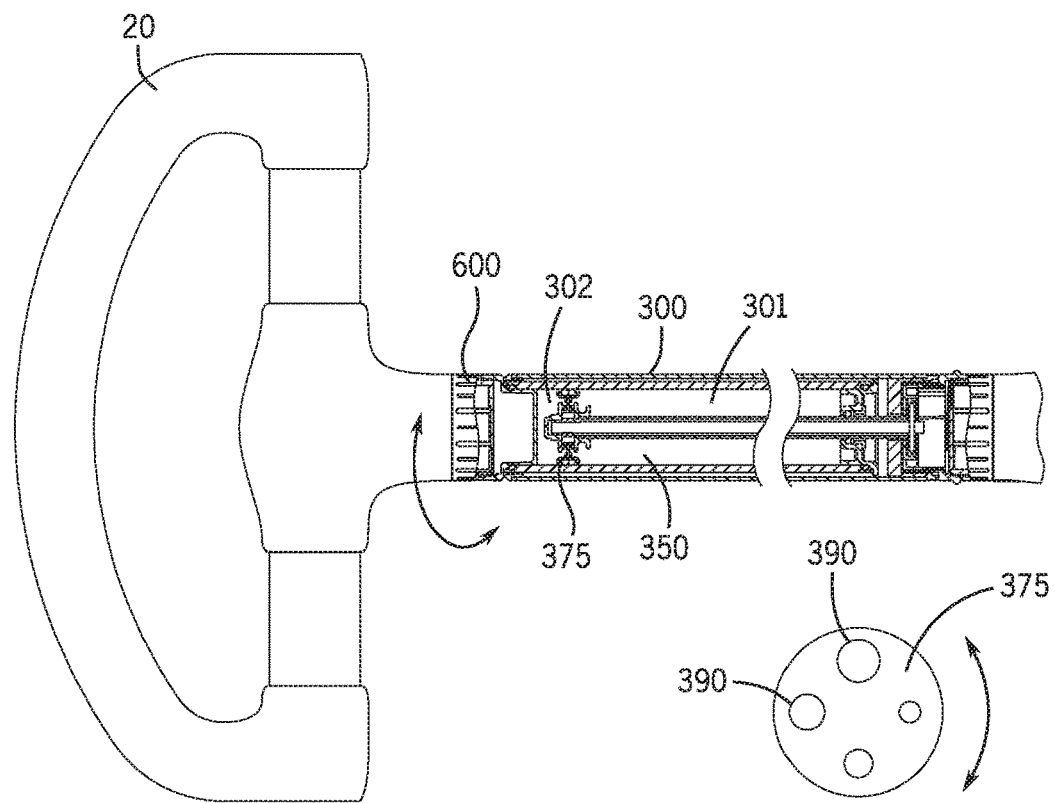
FIG. 12A illustrates an interior view of the main telescoping shaft of the present apparatus.
FIG. 12B illustrates a top view of the selector gasket of the interior of the first unit.

Referring now to FIGS. 6 and 12, in an embodiment, the interior of the main telescoping shaft 40 is illustrated (FIG. 12). In particular, the resistance generated by the device 1 is created by a fluid pressure differential piston mechanism and system located within an interior 300 of the main telescoping shaft 40. In particular, the fluid is located within a closed system, moving from one compartment to a second compartment. Preferably, the fluid 350 is air, but may also be a liquid in an alternative embodiment. An outer cylindrical cap 600 located between the main telescoping shaft 40 and the hand grips 20, 30 may control the resistance. The outer cylindrical cap 600 may have an opening (not visible) wherein a portion of the main telescoping shaft 40 extends through. In particular, an individual may adjust the resistance by turning the outer cylindrical cap 600. When the outer cylindrical cap 600 is turned, a selector gasket 375 located within the interior 300 of the main telescoping shaft 40 is rotated accordingly and various possible settings (including, a 5, 10, 15, 20 pound settings) are selected by the user. When the selector gasket 375 is selected by the user, various sized holes 390 (FIG. 12B) in the selector gasket 375 allow the fluid (preferably air) within the interior 300 of the main telescoping shaft 40 to move to or from a high pressure area 301 to a low pressure area 302 (depending if the device is being extended or contracted). The larger the hole in the selector gasket, the easier it is for the fluid to move and the lesser the resistance. FIG. 6 illustrates the main telescoping shaft 40 being contracted or extended by a user. In particular, a user may pull the first hand grip 20 away from the second hand grip 30 to exercise. FIG. 6 illustrates that the main telescoping shaft 40 may have an outer unit 40A and an interior unit 40B wherein the interior unit 40B telescopically moves with respect to the outer unit 40A when an exercise is performed.

Figure 13:
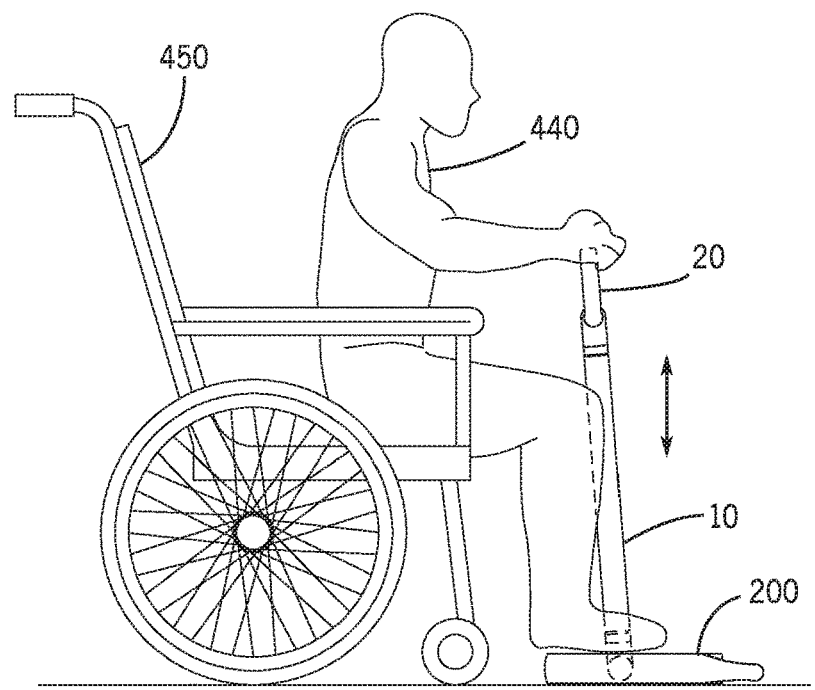
FIG. 13 illustrates a person sitting in a wheelchair with his feet on the second unit of the device and pulling upward.

FIG. 13 illustrates a person 440 sitting in a wheelchair 450 with his feet on the device 1 pulling upward. The device I may also be utilized by a person 440 in a chair or squatting (not illustrated) in the same manner as described above.

Finally, in an embodiment, the device 1 may utilize sensors 500 (FIG. 7), The sensors 500 may be used to monitor the work, time, type and/or effort of the user while using the device 1. For example, the sensors 500 may record the movement and the resistance of the main telescoping shaft 40 as it contracts or expands. The sensors 500 may electronically store the data collected and may allow for the transfer of the data by, for example, Bluetooth, to a smart phone or computer for analysis.

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. An exercise system comprising:
   a first structure having a first handle unit, a second handle unit, and an elongated telescoping shaft wherein the first handle unit and the second handle unit are separated by the elongated telescoping shaft;
   wherein the first handle unit or the second handle unit rotates with respect to the elongated telescoping shaft;
   a second structure wherein the second structure has a top, a bottom, a first side, a second side, a front, a back and a hollow interior portion located on the bottom of the second structure;
   wherein the first handle unit or the second handle unit of the first structure is capable of temporarily locking into and being secured within the hollow interior portion of the second structure;

an elongated rectangular opening on the second structure extending from the front of the second structure toward the center of the second structure wherein the elongated rectangular opening is capable of allowing the elongated telescoping shaft of the first structure to rotate to approximately ninety degrees with respect to the second structure while still securing the first handle unit or second handle unit within the hollow interior portion of the second structure; and a first foot brace and a second foot brace located on the top of the second structure wherein the first foot brace and the second foot brace is separated by the elongated rectangular opening of the second structure.

2. An exercise system comprising:

a first structure having a first handle unit having an opening for gripping the first handle unit, a second handle unit having an opening for gripping the second handle unit, and an elongated telescoping shaft having a length and wherein the first handle unit and the second handle unit are separated by the elongated telescoping shaft and wherein the telescoping shaft provides controlled resistance while expanding the length of the telescoping shaft while manually pulling the first handle unit away from the second handle unit;

wherein the first handle unit or the second handle unit rotates with respect to the elongated telescoping shaft;

a second structure wherein the second structure has a top, a bottom, a first side, a second side, a front, a back and a hollow interior portion located on the bottom of the second structure and wherein the second structure is completely removable from the first structure and wherein the telescoping shaft provides controlled resistance regardless of the first structure being secured to the second structure;

wherein the first handle unit or the second handle unit of the first structure is capable of temporarily locking into and being secured within the hollow interior portion of the second structure;

an elongated rectangular opening on the second structure extending from the front of the second structure toward the center of the second structure wherein the elongated rectangular opening is capable of allowing the elongated telescoping shaft of the first structure to rotate to approximately ninety degrees with respect to the second structure while still securing the first handle unit or second handle unit within the hollow interior portion of the second structure; and a first foot brace and a second foot brace located on the top of the second structure wherein the first foot brace and the second foot brace is separated by the elongated rectangular opening of the second structure.

* * * * *